Dec. 23, 1924.

C. S. PRESTON 1,520,439

VEHICLE TIRE

Filed Nov. 27, 1922  2 Sheets-Sheet 1

Inventor
C. S. PRESTON,
By Edson Bros.
Attorneys

Dec. 23, 1924.
C. S. PRESTON
1,520,439
VEHICLE TIRE
Filed Nov. 27, 1922   2 Sheets-Sheet 2
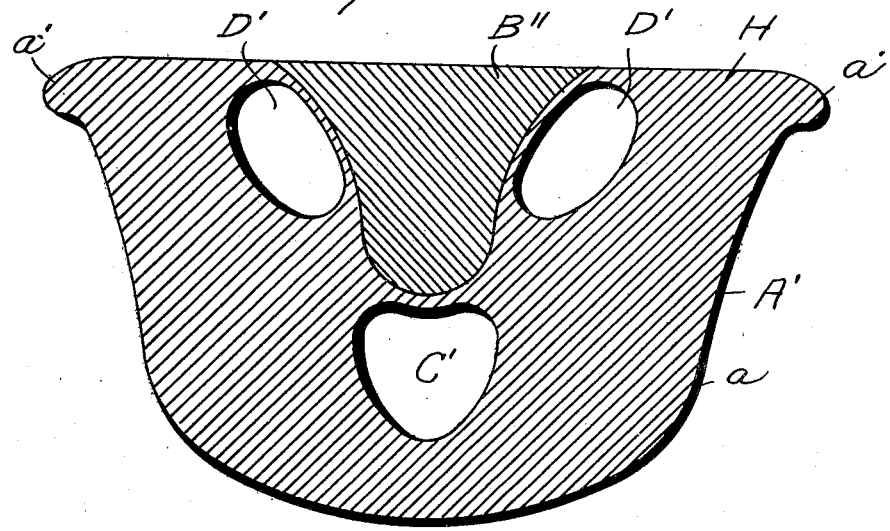
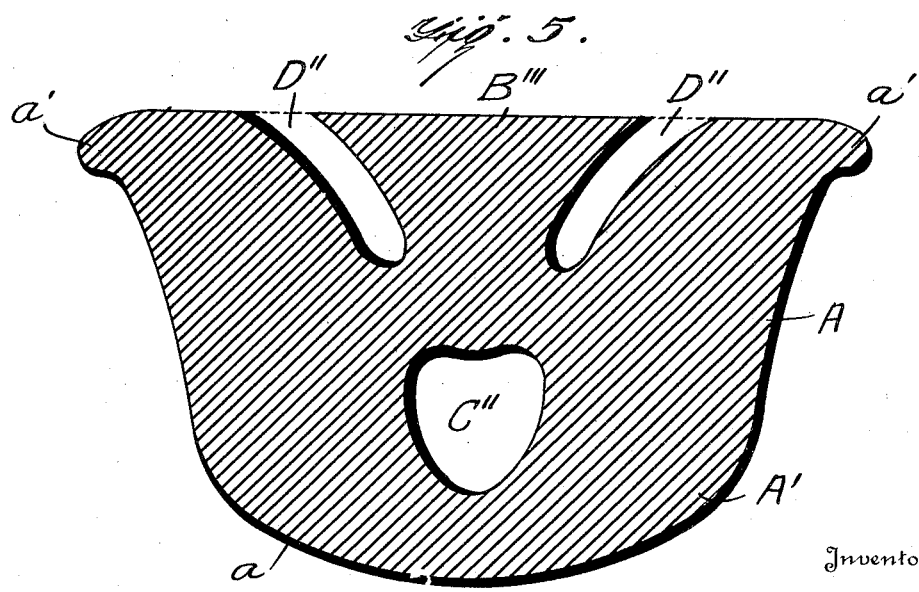
Inventor
C. S. PRESTON,
By Edson Bros
Attorneys Patented Dec. 23, 1924.

1,520,439

UNITED STATES PATENT OFFICE.

CLARENCE STANLEY PRESTON, OF SAN DIEGO, CALIFORNIA.

VEHICLE TIRE.

Application filed November 27, 1922. Serial No. 603,682.

*To all whom it may concern:*

Be it known that I, CLARENCE STANLEY PRESTON, a citizen of the United States, residing at San Diego, in the county of San Diego and State of California, have invented certain new and useful Improvements in Vehicle Tires, of which the following is a specification.

This invention relates to vehicle tires of the solid type, adapted more particularly for trucks, delivery vehicles or other vehicles in which a comparatively heavy load is to be carried.

The principal object of my invention is to provide in a tire of the solid type (as distinguished from a pneumatic tire) annular voids, curvilinear in cross section and free from all angles, as voids angular in cross section would tend to tear or break away at the points of the angles when subjected to load pressure, road shock or pressure incident to fixing the tire to a wheel rim.

Another object of my invention is to provide a tire of the solid type with an interior annular supporting rib or base, adjacent to which are annular voids, curvilinear in cross section, placed in such a position as to form an annular web between the rib and the voids, whereby the said web will be placed under tension and the solid portions of the tire will be forced into said voids at the time the tire is subjected to load pressure or road shock, in such a manner as to absorb road shocks and prevent the jar and jolt incident thereto from being transmitted to the vehicle body.

Another object is to increase the resilience of the solid type of the tire by providing for interior displacement of the solid material in connection with a central solid supporting rib of the same material for placing certain interior portions of the elastic material of the tire under tension for absorbing road shock.

Another object is to strengthen the interior walls of the voids by the insertion therein of common garden hose or tubing of like material of fabric and rubber or fabric and rubber compound, to prevent the collapse of the voids when subjected to pressure, as in the case of fixing the tire to a metal rim, or when the tire is subjected to road shock or load pressure, and if desired the hose or tubing may be filled with compressed air to make a better cushion when subjected to pressure and shock incident to its use.

The matter constituting my invention will be defined in the claims.

I will now describe my invention in detail by reference to the accompanying drawings, in which:

Fig. 4 represents a modification of Fig. 1 in transverse section.

Fig. 5 represents a modification of Fig. 1 in transverse section.

The tire A is made with a solid body A' of rubber compound or other resilient material, and may be molded in the desired form with the interior annular voids, circular in cross section, as set forth in the following description. The body A' is made with a tread portion a, and with annular beads a' at each side of the base H. The tire will preferably be reinforced with strong fabric embedded in the rubber compound as indicated by I, Fig. 2, in order to give the required strength and durability to such portion.

Figure 1:
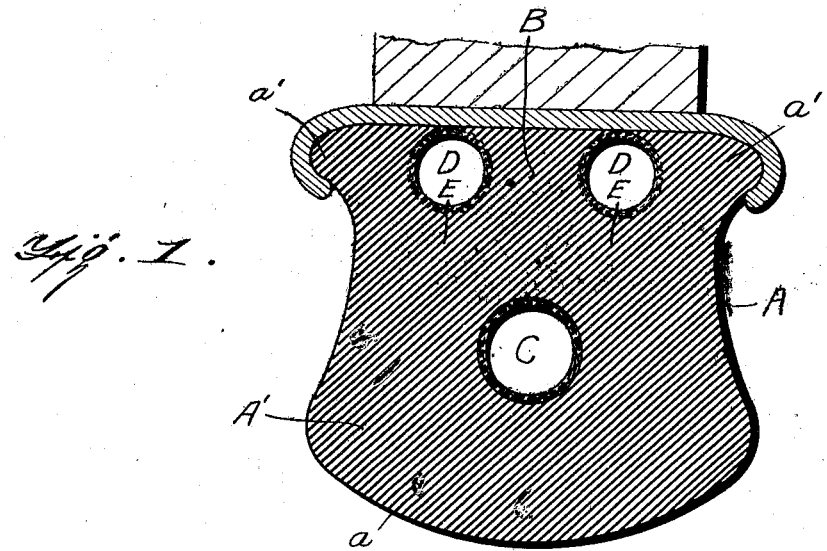
Figure 1 represents a transverse section of a tire embodying my invention.

When molding the tire Fig. 1, I form by a suitable core the central interior void or space C approximately in the center of the tire and the voids D D in close proximity but not to the base H. The annular supporting rib B is located centrally at the base and will preferably be an integral part of the compound body A' as shown in Fig. 1, or may be a separate part as B' shown in Fig. 2 and composed of any suitable material, such as wood or preferably rubber compound, and secured if desired, to the rim K. This rib will bear centrally on a portion of the body directly inside of the central void C. When the tire is constructed as shown in Fig. 1 elastic fins or connecting webs E E are provided on each side of the rib B, and such web portions are placed under tension by a load or road shock. The effect of this will be to push solid material radially outward into the void C, and other portions of the solid material inwardly on each side of the rib into the voids D D. The web portions E E will thus act in a suspensory manner for the tread portion and will be placed under tension by load or road shock, thereby greatly increasing the resiliency of the tire.

Figures 2, 3:
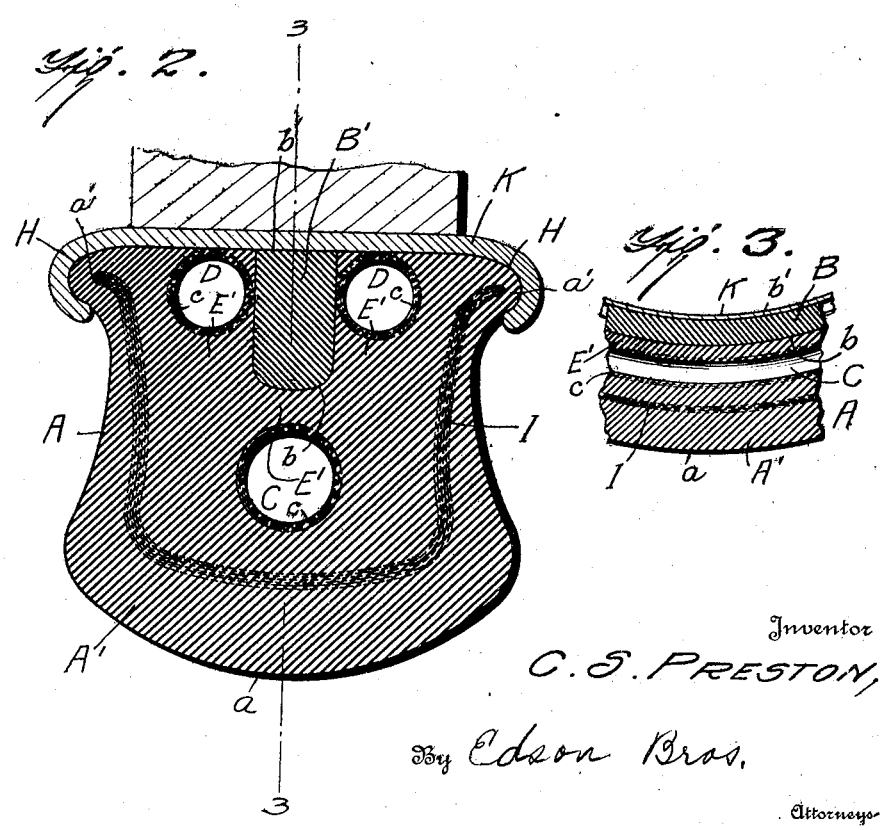
Fig. 2 represents a similar view showing certain modifications in construction.
Fig. 3 represents a section through Fig. 2 showing a segmental portion of a tire.

In case the rib B' is made of a separate part, as shown in Fig. 2, it is preferably made with a transversely curved or polygonal faced outer periphery b, and a flat inner peripheral face b'. In this modified construction of tire the fins E, Fig. 1, will be joined to form an annular saddle portion E' adapted to ride on the rib B', as indicated in Fig. 2. The side portions of this saddle will thus be placed under tension and suspend the solid tread portion of the tire and impart resilience to the structure, as described with reference to Fig. 1.

The annular voids, curvilinear in cross section, are preferably provided with reinforcing material c as garden hose or endless tubing of substantially the same construction, such as fabric and rubber or fabric and rubber compound, to prevent the voids from collapsing when the tire is subjected to load pressure and road shock or pressure incident to fixing the beads a' a' to a tire rim. These tubes may be inflated before the tire undergoes the vulcanizing process and the air drawn out afterwards by a small pin puncture or the air may be left in to act as a cushion and thereby make the tire more resilient in order to better withstand load pressure or road shock.

The number of ribs B', and voids D, and C may be increased in proportion to the width of the tire which must be provided for a heavier type of truck.

In Fig. 4 I show the annular voids D' D' as being elliptical in cross section, and the central voids C' as being heart shaped in cross section.

As previously stated the principal object is to eliminate angles in the annular voids so that they will not easily tear or break away when subjected to strain. No matter what shape of annular void I employ I still keep the principle of suspension which is of great importance.

The tire, as above constructed may be secured to a clencher rim K or vulcanized to a metal rim by a well known process now in use for fastening tires to wheel rims. I do not wish to be limited to any particular means or method of fastening my tire to a wheel rim, but shall use means which may be found most effective for such purpose.

Having described my invention, what I claim and desire to secure by Letters Patent is:

1. A vehicle tire of the solid type comprising a body of resilient material having an annular channel arranged upon its inner periphery, an annular rib arranged in said channel, the body portion also having an annular void, curvilinear in cross section, located centrally thereof and being of substantially the same width as the annular rib, the rib being adapted to project into said annular void under pressure, said body also having two annular voids arranged one on each side of the rib and in close proximity to the inner periphery of the tire, and annular webs of elastic material formed between the said rib and voids, and connecting with the solid material of the tire, whereby said webs, when under load or pressure, will be placed under tension and act to suspend the load and to push the solid material into said voids, thereby increasing the resilience of the tire.

2. A vehicle tire of the solid type comprising a body of resilient material having an annular channel arranged upon its inner periphery, said channel having its walls curved, an annular rib corresponding in shape to the channel, arranged in said channel, the body also having annular voids, one at each side and one at the outer periphery of the rib and having the walls adjacent thereto corresponding to the adjacent surfaces thereof, the annular rib being adapted to project into the void arranged at its outer periphery when under pressure, and a lateral suspending web of elastic material on each side of said rib, there being one of the voids between each web and the inner periphery of the tire.

In testimony whereof I affix my signature.

CLARENCE STANLEY PRESTON.